US012586835B2

(12) United States Patent
Landvik et al.

(10) Patent No.: US 12,586,835 B2
(45) Date of Patent: Mar. 24, 2026

(54) DEVICE AND METHOD FOR CONTROLLING FLOODING OF AT LEAST PART OF AN ENERGY STORAGE SPACE

(71) Applicant: VOLVO TRUCK CORPORATION, Gothenburg (SE)

(72) Inventors: Sondre Landvik, Gothenburg (SE); Edward Jobson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 823 days.

(21) Appl. No.: 17/811,696

(22) Filed: Jul. 11, 2022

(65) Prior Publication Data

US 2023/0011751 A1 Jan. 12, 2023

(30) Foreign Application Priority Data

Jul. 12, 2021 (EP) .................................... 21185134

(51) Int. Cl.
*H01M 10/625* (2014.01)
*A62C 3/16* (2006.01)
(Continued)

(52) U.S. Cl.
CPC ............. *H01M 10/625* (2015.04); *A62C 3/16* (2013.01); *A62C 35/13* (2013.01); *A62C 37/40* (2013.01);
(Continued)

(58) Field of Classification Search
CPC ............. H01M 10/625; H01M 10/613; H01M 10/6567; H01M 10/627; H01M 10/63;
(Continued)

(56) References Cited

U.S. PATENT DOCUMENTS

| | | | |
|---|---|---|---|
| 10,923,788 B1* | 2/2021 | Loveness | .......... H01M 10/6557 |
| 2015/0188203 A1* | 7/2015 | Enomoto | .............. H01M 50/24 |
| | | | 429/83 |

(Continued)

FOREIGN PATENT DOCUMENTS

| | | | | |
|---|---|---|---|---|
| DE | 102011080706 A1 * | 2/2013 | ............ | H01M 50/20 |
| EP | 2804188 A1 | 11/2014 | | |

(Continued)

OTHER PUBLICATIONS

DE_102011080706_A1 (Year: 2011) Original File and Translation.*

(Continued)

*Primary Examiner* — Ula C Ruddock
*Assistant Examiner* — Katherine J Metzger
(74) *Attorney, Agent, or Firm* — Jeffri A. Kaminski; Venable LLP

(57) ABSTRACT

A method performed by a control unit for controlling flooding of at least part of an energy storage space. The energy storage space comprises at least one Energy Storage System, ESS. The control unit detects that a critical condition associated with the at least one ESS is present. When the critical condition has been detected, the control unit initiates flooding of at least part of the energy storage space with a fluid from a reservoir. The control unit controls the flooding of the energy storage space such that the at least one ESS is submersed to a submersion level where the critical condition is no longer present.

11 Claims, 7 Drawing Sheets

100

(51) Int. Cl.

| | |
|---|---|
| *A62C 35/13* | (2006.01) |
| *A62C 37/40* | (2006.01) |
| *H01M 10/613* | (2014.01) |
| *H01M 10/6567* | (2014.01) |
| *H01M 50/24* | (2021.01) |
| *H01M 10/627* | (2014.01) |
| *H01M 10/63* | (2014.01) |

(52) U.S. Cl.

CPC ..... *H01M 10/613* (2015.04); *H01M 10/6567* (2015.04); *H01M 50/24* (2021.01); *H01M 10/627* (2015.04); *H01M 10/63* (2015.04); *H01M 2200/10* (2013.01); *H01M 2200/20* (2013.01); *H01M 2220/10* (2013.01); *H01M 2220/20* (2013.01); *Y02E 60/10* (2013.01)

(58) Field of Classification Search

CPC ............. H01M 50/24; H01M 2200/10; H01M 2200/20; H01M 2220/20; H01M 2220/10; A62C 3/16; A62C 35/13; A62C 37/40; Y02E 60/10

See application file for complete search history.

(56) References Cited

U.S. PATENT DOCUMENTS

| | | | |
|---|---|---|---|
| 2020/0101335 A1 | 4/2020 | Liu et al. | |
| 2020/0350531 A1* | 11/2020 | Edwards ............. | H01M 10/625 |
| 2021/0066768 A1* | 3/2021 | Gao ................... | H01M 50/609 |

FOREIGN PATENT DOCUMENTS

| | | |
|---|---|---|
| GB | 2584287 A | 12/2020 |
| WO | 2020081266 A1 | 4/2020 |

OTHER PUBLICATIONS

DE_102018120285_A1 (Year: 2018) Original File and Translation.*

DE102011080706A1_Description_20250613_1258_Translation (Year: 2011).*

European Search Report dated Dec. 22, 2021 in corresponding European Patent Application No. 21185134.0, 8 pages.

* cited by examiner

100

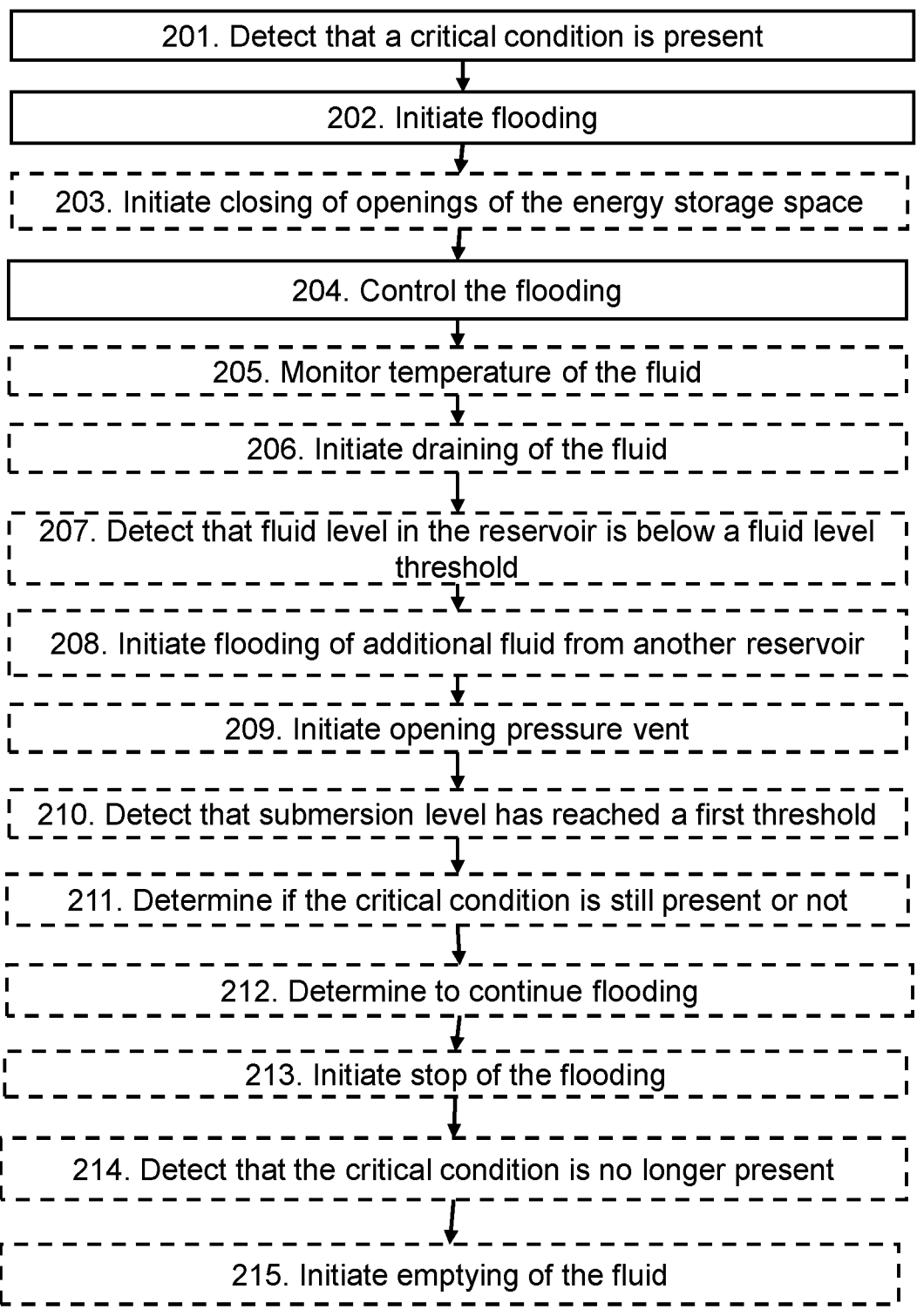

201. Detect that a critical condition is present

202. Initiate flooding

203. Initiate closing of openings of the energy storage space

204. Control the flooding

205. Monitor temperature of the fluid

206. Initiate draining of the fluid

207. Detect that fluid level in the reservoir is below a fluid level threshold

208. Initiate flooding of additional fluid from another reservoir

209. Initiate opening pressure vent

210. Detect that submersion level has reached a first threshold

211. Determine if the critical condition is still present or not

212. Determine to continue flooding

213. Initiate stop of the flooding

214. Detect that the critical condition is no longer present

215. Initiate emptying of the fluid

Fig. 2

DEVICE AND METHOD FOR CONTROLLING FLOODING OF AT LEAST PART OF AN ENERGY STORAGE SPACE

TECHNICAL FIELD

The invention relates to a control unit and a method performed by the control unit. More particularly the invention relates to controlling flooding of at least part of an energy storage space.

BACKGROUND

The number and variety of applications for batteries in today's society is increasing. For example, they are used in vehicles, at construction sites, in solar panel systems, in the power grid system etc. Even though a battery may have finished its time in its first life application, the battery may still be used in a second life application. Traction voltage batteries having served its first life in targeted application like commercial vehicles will increasingly be used for second life applications with more electrical vehicles hitting the road. One example of such second life application may be to use the traction voltage batteries in buildings, e.g., apartment buildings, to store energy from solar panels, balance the grid peaks, charge cars etc.

With the increased use of batteries, there is also an increased safety concern that needs to be taken into account. For example, there are safety concerns by installing so much energy in buildings where people will be living, and safety mechanisms must be ensured. A thermal runaway in the batteries in many 100 s of kWh in such a building needs to be avoided and handled if it occurs.

In the case of a thermal runaway or any other critical condition associated with batteries, it is necessary to cool down the complete battery pack to ensure that oxygen is not able to be produced, driving the runaway further.

Sprinkler systems are commonly used in for example apartment buildings and office buildings, and they may be used to cool down the battery pack. However, today's sprinkler systems are not dimensioned for this purpose.

There are systems where the battery box or compartment where the battery pack is kept is flooded with water. However, it is a complex procedure to insert water into the battery box since it is often designed to not be opened from the outside. In case multiple battery boxes are stored in a room, it may be a complex procedure to insert water into all battery boxes. It is also a safety risk for the personnel who performs this operation since they need to be in direct contact with the battery box having the thermal runaway in order to flood it with water.

In other systems, the compartment where the battery pack is kept is sealed off by inserting a dedicated sealing wall to form a sealed compartment which is then flooded with water in case of a critical condition. However, the sealing wall and the process of sealing the compartment is complex and needs to be performed manually by authorized personnel.

Therefore, there is a need to at least mitigate or solve this issue.

SUMMARY

An object of the invention is to provide improved handling of flooding of at least part of an energy storage space.

According to a first aspect of the invention, the method is performed by a control unit and is for controlling flooding of at least part of an energy storage space. The energy storage space comprises at least one Energy Storage System (ESS). The control unit detects that a critical condition associated with the at least one ESS is present. When the critical condition has been detected, the control unit initiates flooding of at least part of the energy storage space with a fluid from a reservoir. The control unit controls the flooding of the energy storage space such that the at least one ESS is submersed to a submersion level where the critical condition is no longer present.

By the provision of a method where the control unit initiates and controls flooding of the at least part of the energy system until the critical condition is no longer present, the advantage is that the critical condition is no longer a safety concern. With the method, the ESS may be safely used for providing power without any safety concerns on a regular basis since a critical condition will be handled if it occurs. When only at least a part of the energy storage space is flooded with the fluid, then some or all of the ESS's are submerged in the fluid. There may be some ESS that are submersed and others that are not submerged. For example, the ESS located at the floor or at a low height of the energy storage space may be submerged, while the higher located ESS may not be submerged. If a critical condition happens, all ESS's comprised in the energy storage space are cut off electrically such that none of the ESS's, submerged or not, are used during the critical condition. An advantage is that after the critical situation is over and the fluid is drained, the ESS that did not get submerged can be inspected and potentially continue to be used, while the submerged ESS, even though they did not have the crucial condition themselves, may be critically damaged by the fluid and can be removed, replaced or repaired. Only the necessary ESS's may be submersed in the fluid, thereby protecting the ESS stored above. An advantage of using fluid from a reservoir, which may for example be an already existing reservoirs in association with the energy storage space, is that the fluid is in close proximity to the energy storage space such that the submersion may start to take place without any delay when the critical condition has been detected. When the reservoir is an already existing reservoirs, i.e. an existing body of water, there may be an advantage that no extra costs for providing the reservoir if necessary. It is efficient and cost effective to use an already existing reservoir.

According to one embodiment, the control unit may detect that a submersion level in the energy storage space has reached a first threshold. When the first threshold is reached, the control unit may determine if the critical condition is still present or not. The control unit may determine to continue flooding the at least part of the energy storage space if the critical condition is still present, and initiate stop of the flooding if the critical condition is not present. Hereby, an advantage of that the energy storage space is only flooded up to a minimum necessary level in order to the critical condition to not be present anymore. It is not necessary to flood the energy storage space completely. With this, it will be less fluid to drain from the energy storage space afterwards and less fluid to refill into the reservoir. Another advantage is that it will lead to a less damage to the ESS not being associated with the critical condition.

According to a further embodiment, the control unit may initiate closing of one or more openings of the energy storage space when the critical condition has been detected and before initiating the flooding. Hereby an improvement of reducing the risk of unnecessary fluid leakage from the energy storage space during the flooding may be provided. Another improvement may be that pressure build-up may be reduced or mitigated.

According to a further embodiment, the fluid may be comprised in the reservoir located at a higher level than the energy storage space, at a lower level than the energy storage space or at the same level as the energy storage space. An advantage of the location at the higher level may be that the fluid will flow from the reservoir to the energy storage space due to gravity and without any need for e.g. a pump or similar in order to enable the fluid flow. An advantage of the location at the lower level may be that the invention is applicable to for example an energy storage space located below the ground, e.g., in a mine, and where the reservoir is a lake on ground. An advantage of the location at the same level may be that the invention is applicable where the energy storage space is located at the ground, e.g., in a container at a construction site, and the reservoir is a lake on ground.

According to a further embodiment, the flooding may be initiated by opening at least one fluid valve and/or activating a pump connected to the reservoir enabling the fluid to flow from the reservoir and into to the energy storage space. The fluid valve and/or pump may be at an inlet to the energy storage space or at an outlet from the reservoir. There may be either a fluid valve or a pump or both a fluid valve and pump. An advantage of the fluid valve may be that it the fluid flow may be easily controlled, started and stopped. An advantage of a pump is that the speed of the fluid flow may be increased or decreased if necessary.

According to a further embodiment, the critical condition may be a short-circuit, a thermal runaway or a thermal event. Hereby, a variety of critical conditions may be controlled.

According to a further embodiment, the control unit may initiate opening of at least one pressure vent in the energy storage space when the flooding has been initiated or if pressure in the energy storage space above a pressure threshold has been detected after the flooding has been initiated. An advantage of this may be that that pressure build-up may be reduced or mitigated.

According to a further embodiment, the control unit may detect that the critical condition is no longer present, and initiate emptying of the fluid from the energy storage space when the critical condition is no longer present. An advantage of this embodiment may be that the energy storage space may be used again after the fluid has been removed. It may also reduce or mitigate possible damages that the fluid may cause to the energy storage space as compared to if the fluid has not been removed.

According to a further embodiment, the control unit may monitor the temperature of the fluid in the energy storage space to detect if the temperature is above a temperature threshold. The control unit may initiate draining of the fluid from the energy storage space if the temperature is above the temperature threshold. At the same time as the draining takes place, the fluid flow into the energy storage space continues. The monitoring will detect a temperature increase until the cooling capacity is lower than wanted, and then draining may be initiated. A fluid level sensor may, at the same time as the draining is performed, ensure that the ESS to which the critical condition is associated is submersed to a sufficient level where there the critical condition is no longer present. An advantage of this may be that it ensures that the fluid has sufficient cooling capacity and reduces or mitigates the risk for boiling and pressure build-up etc. A continuous fluid flow is created or maintained when the fluid temperature is above the temperature threshold, e.g. a high temperature. The hot fluid is drained and new fluid flows into the energy storage space.

According to a further embodiment, the control unit may detect that fluid level in the reservoir is below a fluid level threshold, and initiate flooding of additional fluid from another reservoir when the fluid level is below the fluid level threshold. This may provide an advantage in case the reservoir is low on fluid, either at start of the flooding or during the flooding. When additional fluid from another reservoir may be used, it reduces the risk of not being able to remove the critical condition due to the low fluid level in the reservoir, i.e., the main or original reservoir.

According to a further embodiment, the energy storage space may be a room or a container. The room may be for example in a basement in a building, e.g., an apartment building or an office building. The container may be located at a construction site where the ESS is adapted to provide power to the construction site, it may be located in the forest where the ESS is adapted to provide power to timber trucks etc.

According to a second aspect of the invention, a control unit for controlling flooding of at least part of an energy storage space is provided. The control unit is configured to perform the steps of the method according to any one of the embodiments as disclosed herein. Advantages and effects of the control unit are largely analogous to the advantages and effects of the method. Further, all embodiments of the method are applicable to and combinable with all embodiments of the control unit, and vice versa.

According to a third aspect of the invention, the safety system comprises a control unit as disclosed herein. The safety system comprises a reservoir comprising a fluid, and a conduit adapted for fluid flow from the reservoir to the energy storage space. Advantages and effects of the safety system are largely analogous to the advantages and effects of the method. Further, all embodiments of the method are applicable to and combinable with all embodiments of the safety system, and vice versa.

According to a fourth aspect of the invention, the computer program comprises program code means for causing the control unit to perform the steps of the method according to any one of the embodiments as disclosed herein.

According to a fifth aspect of the invention, the computer readable medium is carrying a computer program comprising program code means for causing the control unit to perform the steps of the method according to any one of the embodiments as disclosed herein, when the program product is run on a computer.

The invention is not limited to the features and advantages mentioned above. A person skilled in the art will recognize additional features and advantages upon reading the following detailed description.

BRIEF DESCRIPTION OF THE DRAWINGS

The invention will now be further described in more detail by way of example only in the following detailed description by reference to the appended drawings illustrating the embodiments and in which:

In the drawings:

FIG. 2 is a flow chart illustrating a method.

The drawings are not necessarily to scale and the dimensions of certain features may have been exaggerated for the sake of clarity. Emphasis is instead placed upon illustrating the principle of the embodiments herein.

DETAILED DESCRIPTION OF EXAMPLE EMBODIMENTS OF THE INVENTION

As mentioned above, there is a need for safety mechanism that can handle critical conditions associated with ESS' in energy storages spaces. For example, the ESSs may be used in buildings, e.g., apartment buildings, to store energy from solar panels, balance the grid peaks, charge cars etc. There are however safety concerns by installing so much energy in buildings where people will be living, and safety mechanisms must be ensured. A thermal runaway in many hundreds of kWh in such a building needs to be avoided and handled if it occurs. Other examples will be provided later. In the case of a thermal runaway, it may be desirable to cool down the complete ESS to ensure that oxygen is not able to be produced, driving the runaway further. The present invention solves this by submerging the ESS with a fluid from a reservoir.

Figure 1:
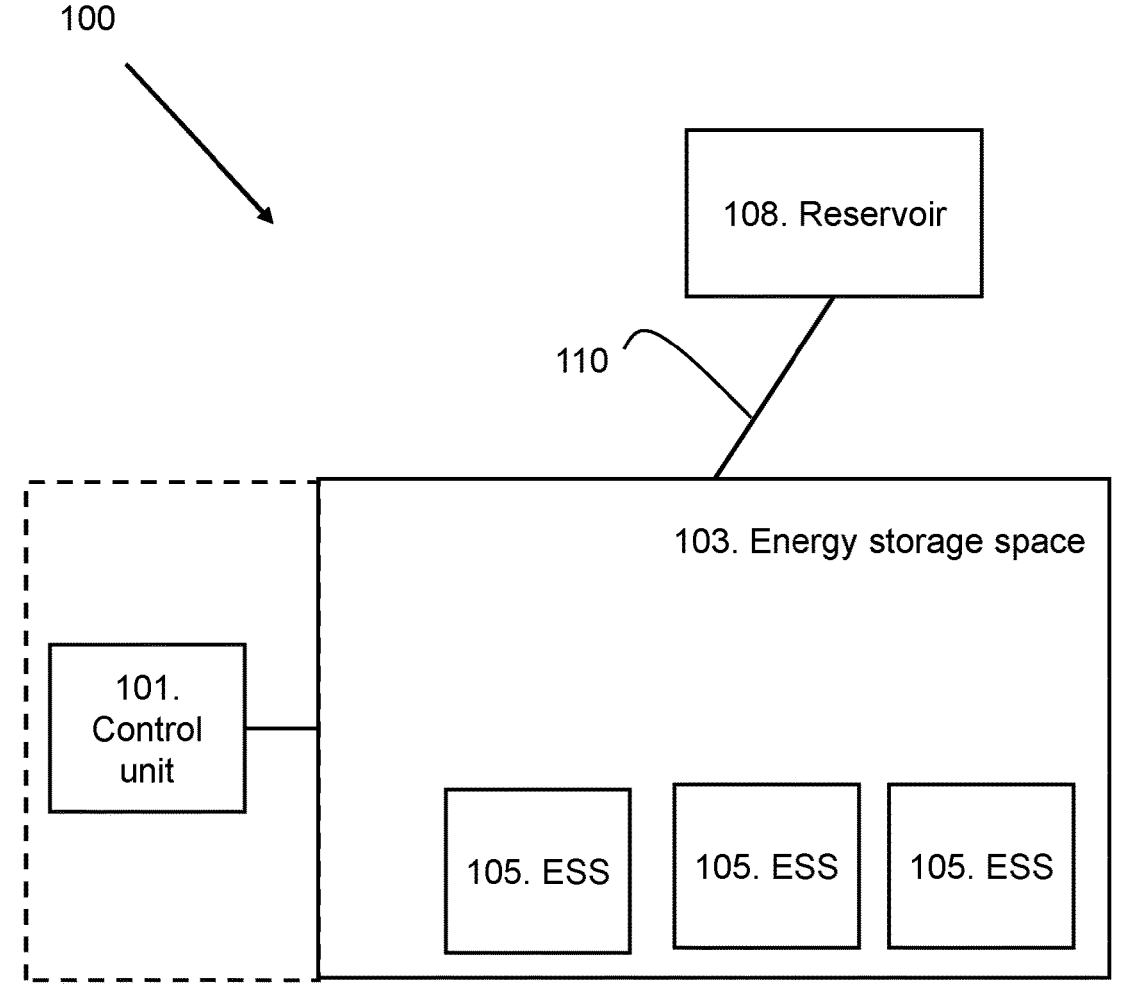
FIG. 1 is a schematic illustration of a safety system.

FIG. 1 is a schematic illustration of a safety system 100. The safety system 100 comprises a control unit 101. The control unit 101 is adapted for controlling flooding of at least part of an energy storage space 103. The control unit 101 may be connected, wirelessly or via wire, to the energy storage space 103. The control unit 101 may be located in the energy storage space 103, as indicated with the dotted lines in FIG. 1 or it may be located at a different location than the energy storage space 103, e.g., outside the energy storage space 103, in proximity to the energy storage space 103 or at any other suitable location form where it can control the flooding of at least part of an energy storage space 103. The control unit 101 may be an electronic control unit comprising processing circuitry. The control unit 101 may be a computer. The control unit 101 may comprise hardware or hardware and software. The control unit 101 may be adapted to monitor and detect a critical condition associated with at least one ESS 105 comprised in the energy storage space 103.

The energy storage space 103 may be a room in a building, e.g., an apartment building, an office building, a hotel, a hospital etc. The room may be in the basement of the building or in any other suitable floor in the building. The energy storage space 103 may be a container located at any suitable location such as for example a construction site, in the forest, in a mine, at an airport etc. A container may be described as a metal box used for storing goods. The container may be for example 2.43 m wide, either 2.59 or 2.89 m high and either 6.06 m or 12.2 m long, or the container may have any other suitable dimension adapted to store at least one ESS 105.

The energy storage space 103 comprises at least one ESS 105. The ESS 105 may comprises at least one battery pack, and the battery pack may comprise at least one battery cell. FIG. 1 illustrates three ESS's 105 as an example, but the energy storage space 103 may comprise any n number of ESS 105, where n is a positive integer. The ESS 105 may be described as a box or container where the at least one battery pack is located. The ESS 105 may comprise any m number of battery packs, where m is a positive integer. Each battery pack may comprise p number of battery cells, where p is a positive integer. When the ESS 105 is comprised in the energy storage space 103 it may be the first life application or a second or later life application of the ESS 105. The ESS 105 may comprise traction voltage batteries previously used in at least partly electrical vehicles and now having a second life in the energy storage space 103 or they may be any other types of batteries. The ESS 105 may have its first life in the energy storage space 105, for example an ESS that is designed for stationary purposes. As an example, the dimension of the ESS 105 may be for example 0.5 m×0.5 to 2-3 long, but even larger ESS 105 are also applicable to the invention. The energy storage space 105 may comprise other systems or units, in addition to the ESS 105, but they will not be described in more detail here. If the energy storage space 103 comprises multiple ESS's 105, then these multiple ESS's 105 may be organized in any suitable fashion, e.g., stacked on top of each other in one or several layers, stored side by side etc. Summarized, the energy storage space 103 comprises at least one ESS 105, the at least one ESS 105 comprises at least one battery pack, and the battery pack comprises at least one battery cell. It is then two levels of boxes or containers surrounding the battery pack, i.e., the ESS 105 and the energy storage space 103. The number of ESS's 105 comprised in the energy storage space 105 may vary over time, a damaged or defect ESS 105 may be removed and replaced by another ESS 105, the number of ESS 105 may be increased or reduced in line with the need for power. The energy storage space 105 may be described as the space where the at least one ESS 105 is located when power from it is used for the desired application, e.g., to store energy from solar panels. A critical condition may occur in the at least one ESS 105 such as a short-circuit, a thermal runaway or a thermal event etc. When a critical condition occurs and is detected, it needs to be reduced or removed.

There may be one or more openings in the energy storage space 103 such as for example doors, windows, hatches etc. The opening may be closed when the critical condition has been detected, e.g., to prevent the fluid from flowing out of the energy storage space 103. The one or more openings may be controlled by the control unit 101, i.e., the control unit 101 may initiate closing or opening of them.

The energy storage space 103 may comprise at least one pressure vent (not shown in FIG. 1). The pressure vent may be located at any suitable location in the energy storage space 103 where such that it can regulate the pressure in the energy storage space 103 if necessary. The pressure vent may be opened when the flooding has been initiated or if pressure in the energy storage space 103 above a pressure threshold has been detected after the flooding has been initiated or at any other suitable time when pressure needs to be reduced in the energy storage space 103. The at least one pressure vent may be controlled by the control unit 101.

The safety system 100 may comprise a pressure sensor (not shown in FIG. 1) which may be adapted to monitor the pressure in the energy storage space 103 and to transmit results of the pressure monitoring to the control unit 101 continuously, at regular or irregular intervals, when a pressure has been measured, when a pressure has changed compared to a previous measurement, upon request form the control unit 101 or at any other suitable time. The pressure sensor may be adapted to communicate with the control unit 101 or with both the control unit 101 and the pressure vent.

A temperature sensor may be comprised in the energy storage space 103 and adapted to monitor the temperature in the fluid flooding into the energy storage space 103. The temperature sensor may be adapted to communicate with the control unit 101, for example by transmitting results of the temperature monitoring to the control unit 101. The results of the temperature monitoring may be provided to the control unit 101 continuously, at regular or irregular intervals, when a temperature has been measured, when a temperature has changed compared to a previous measurement, upon request form the control unit 101 or at any other suitable time.

There may be a drain or outlet conduit (not shown in FIG. 1) comprised in the energy storage space 103 through which the fluid can be drained from the energy storage space when the critical condition is no longer present or at any suitable time. There may be a valve associated with the drain or outlet conduit and which may be controllable by the control unit 101 to initiate draining of the fluid.

A first fluid level sensor (not snow in FIG. 1) may be comprised in the energy storage space 103 which may be adapted to monitor the fluid level in the energy storage space 103. The first fluid level sensor may provide information about the fluid level in the energy storage space 103 to the control unit 101, e.g., continuously, at regular or irregular intervals, upon request form the control unit 101 or at any other suitable time. The first fluid level sensor may be adapted to communicate with the control unit 101.

The safety system 100 comprises a reservoir 108 comprising a fluid. The reservoir 108 may be an existing reservoir 108 which primarily has another function, or it may be a reservoir dedicated for providing fluid to the energy storage space 103. The reservoir 108 may be for example a swimming pool, a lake, a water container etc. The reservoir 108 may be located at a higher level than the energy storage space 103, at a lower level than the energy storage space 103 or at the same level as the energy storage space 103.

There may be a second fluid level sensor comprised in the reservoir 108 adapted to monitor the fluid level in the reservoir 108. The second fluid level sensor may be adapted to provide information about the fluid level in the reservoir 108, i.e., results of the fluid level monitoring, to the control unit 101 continuously, at regular or irregular intervals, when a fluid level has been measured, when a fluid level has changed compared to a previous measurement, upon request form the control unit 101 or at any other suitable time. The second fluid level sensor may be adapted to communicate with the control unit 101.

The fluid may be any suitable fluid with characteristics that reduces or mitigates the critical condition when the at least one ESS 105 is submersed in the fluid. The fluid may be for example water, gel, water mixed with a chemical, a temperature cooling fluid etc. The fluid may be mixed with an additional chemical or fluid on the way to the energy storage space 103. The additional chemical or fluid may provide increased flexibility to add additional properties to the fluid.

A conduit 110 is connected between the reservoir 108 and the energy storage space 103 and is adapted for fluid flow from the reservoir 108 to the energy storage space 103. The end of the conduit 110 that is connected to the energy storage space 103 may be located at any suitable position in the energy storage space 103, for example close to or at the top of one side of the energy storage space 103, at the middle of one side of the energy storage space 103, or close to or at the bottom of one side of the energy storage space 103. The dimensions of the conduit 110 may depend on the size of the energy storage space 103, the distance to the reservoir 108, the height difference between the energy storage space 103 and the reservoir 108 etc. The dimensions of the conduit may be dimensioned case by case. An example of the dimensions may be a diameter of 4-15 cm, and a length from a few meters to 20-40 meters.

There may be at least one fluid valve connected to the reservoir 108 (not shown in FIG. 1). The fluid valve may be an outlet from the reservoir 108 or an inlet to the energy storage space 103. The outlet may be connected at one end of the conduit 110 and the inlet may be connected at the other end of the conduit 110. The at least one fluid valve may enable the fluid to flow from the reservoir 108 and into to the energy storage space 103 The fluid valve may be either closed or open, or it may be at any suitable position between open and closed. The at least one fluid valve may be controlled by the control unit 101.

The safety system 100 may comprise an additional reservoir in addition to the one that is illustrated in FIG. 1. The reservoir 110 shown in FIG. 1 may in such scenario be referred to as a main reservoir. Fluid from the additional reservoir may be used for flowing the energy storage space 103 if the fluid level in the main reservoir 110 is below a fluid level threshold, e.g., measured by a fluid level sensor. This additional reservoir may comprise a fluid which may be of the same or a different type compared to the fluid in the main reservoir 110. The additional reservoir may be connected to the energy storages space 103 via an additional conduit which is dedicated for the additional reservoir. The additional reservoir may be connected to the conduit 110 such that fluid from both reservoirs can flood the energy storage space 103. An additional conduit may be connected to the additional reservoir in one end and to the main reservoir in the other end such that fluid flows from the additional reservoir into the main reservoir 110, and then the fluid flows from the main reservoir 110 into the energy storage space 103. The main reservoir 110 and the additional reservoir may be of the same or different types. For example, the main reservoir may be a lake and the additional reservoir may be a mobile fluid tank or both reservoirs may be swimming pools. The additional reservoir may be the fresh water supply.

A method performed by the control unit 101 for controlling flooding of at least part of an energy storage space 103 will now be described with reference to FIG. 2. FIG. 2 is a flow chart illustrating the method performed by the control unit 101. The energy storage space 103 may be a room or a container. The method comprises at least one of the following steps, which steps may be performed in any suitable order than described below:

Step 201

The control unit 101 detects that a critical condition associated with the at least one ESS 105 is present. The critical condition may be detected by that the at least one ESS 105 sends an error message to the control unit 101, by that the control unit 101 receives, from the temperature sensor, information about the temperature in the energy storage space 103 being above a threshold, by that an operator has manually detected the critical condition, e.g. he has visually seen indications of a thermal runaway, and sends information about this, via a display, to the control unit 101 etc.

The critical condition may be a short-circuit, a thermal runaway or a thermal event. The critical condition may be detected when there is for example an impedance/resistance runaway, a voltage drop, a current runaway, a temperature runaway, a heat detected by radiation etc.

When the ESS 105 is comprised in the energy storage space 103, it may be described as a first life application or a second life application of the ESS 105.

Step 202

When the critical condition has been detected, the control unit 101 initiates flooding of at least part of the energy storage space 103 with a fluid from a reservoir 108. It is primarily the energy storage space 103 that is flooded with the fluid, and not the ESS 105.

Depending on the integrity of the ESS 105, the fluid may further flood into the ESS 105, but this may not be necessary in order for the critical condition to be removed. The fluid flows into the energy storage space 103 where the ESS 105 is stored. The energy storage space 103 is an existing space where the ESS 105 is stored.

The fluid is comprised in the reservoir 108 may be located at a higher level than the energy storage space 103, at a lower level than the energy storage space 103 or at the same level as the energy storage space 103.

The flooding may be initiated by opening at least one fluid valve connected to the reservoir 108 enabling the fluid to flow from the reservoir and into to the energy storage space 103. The initiating may be done by the control unit 101 sending instructions to the fluid valve to change from closed state to open state. The open state may be partly open or fully open.

Step 203

The control unit 101 may initiate closing of one or more openings of the energy storage space 103 when the critical condition has been detected and before initiating the flooding. The openings may be doors, windows, hatches etc. which may be automatically controlled by the control unit 101.

Step 204

The control unit 101 controls the flooding of the energy storage space 103 such that the at least one ESS 105 is submersed to a submersion level where the critical condition is no longer present.

When the critical condition is no longer present, the submersion level may be such that a part of the whole ESS 105 which the critical condition is associated with is submersed. It may necessary that the whole ESS 105 is submersed in order for the critical condition to be removed, or it may be sufficient that only a part of the ESS 105 is submersed for the critical condition to be removed.

Step 205

The control unit 101 may monitor the temperature of the fluid flooding in the energy storage space 103 to detect if the temperature is above a temperature threshold. The control unit 101 may obtain information about the temperature from a temperature sensor comprised in the energy storage space 103.

Step 206

The control unit 101 may initiate draining of the fluid from the energy storage space 103 if the temperature is above the temperature threshold. This may be done by that the control unit 101 sends instructions to an outlet valve to change from closed state to open state or to a pump to start pumping the fluid out of the energy storage space 103. The first fluid level sensor may ensure that the critical ESS 105 is always submersed and that the reservoir 108 is not drained fully.

Step 207

The control unit 101 may detect that fluid level in the reservoir 108 is below a fluid level threshold. For example, the second fluid level sensor in the reservoir 108 may provide information about the fluid level to the control unit 101.

Step 208

The control unit 101 may initiate flooding of additional fluid from another reservoir when the fluid level in the reservoir 108 is below the fluid level threshold. In order to initiate the flooding, the control unit 101 may send instructions to an outlet connected to the reservoir 108 enabling the fluid to flow out from the energy storage space 103. The initiating may be done by the control unit 101 sending instructions to the outlet to change from closed state to open state. The open state may be partly open or fully open. There may be a fluid valve associated with the outlet which may receive the instructions instead of the outlet itself.

The initiating may comprise to send instructions to operator or rescue personnel that additional fluid is necessary and that they are requested to perform the necessary actions in order for it to take place, e.g., to open a valve to the other reservoir.

Step 209

The control unit 101 may initiate opening of at least one pressure vent in the energy storage space 103 when the flooding has been initiated or if pressure in the energy storage space 103 above a pressure threshold has been detected after the flooding has been initiated. The pressure may be monitored by a pressure sensor, and which provides information about the pressure to the control unit 101.

Step 210

The control unit 101 may detect that the submersion level in the energy storage space 103 has reached a first threshold. The first threshold may be for example ¼ of the total height of the energy storage space 103, it may correspond to the height of the ESS 105, it may correspond to half the height of the ESS 105, it may be 30 cm or any other suitable value.

Step 211

When the first threshold is reached, the control unit 101 may determine if the critical condition is still present or not. This may be done by the control unit 101 that analyses messages from the ESS 105, information about the temperature in the energy storage space 103 from the temperature sensor, information from the operator, rescue personnel or others etc.

Step 212

The control unit 101 may determine to continue flooding the at least part of the energy storage space 103 if the critical condition is still present.

Step 213

The control unit 101 may initiate stop of the flooding if the critical condition is not present. Stop of the flooding may be initiated by the control unit 101 sending an instruction to the fluid valve to change from open state to close state.

Step 214

The control unit 101 may detect that the critical condition is no longer present.

Step 215

The control unit 101 may initiate emptying of the fluid from the energy storage space 103 when the critical condition is no longer present. This may be done by the at least one ESS 105 sends an ok message to the control unit 101, by that the control unit 103 receives, from the temperature sensor, information about the temperature in the energy storage space 103 being below a threshold, by that an operator has manually detected that the critical condition is no longer present, e.g. he has visually seen no more indications of a thermal runaway, and sends information about this, via a display, to the control unit 101 condition, etc.

There may be inlet holes in the energy storage space 103 at a position above ground where emergency personnel may pump in fluid to flood the energy storage space 103 manually.

The fluid in the reservoir 108 may be used in the cooling circuit for the ESS 105 under normal operation. The ESS 105 may then be used to heat the fluid in the reservoir 108 which may be an advantage when the reservoir 108 is for example a swimming pool.

Figure 3:
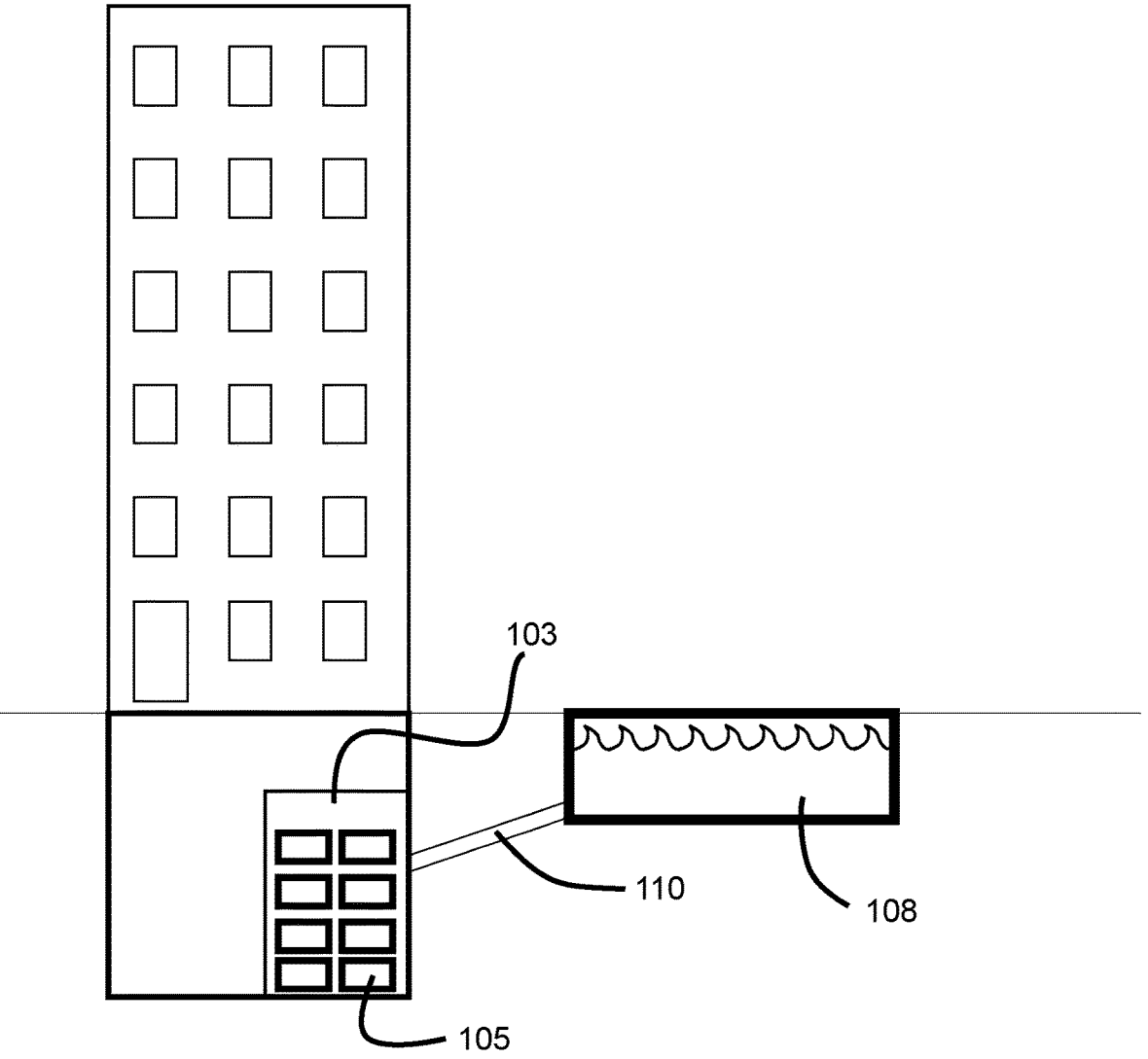
FIG. 3 is a schematic illustration of a safety system before the energy storage space is flooded.
Figure 4:
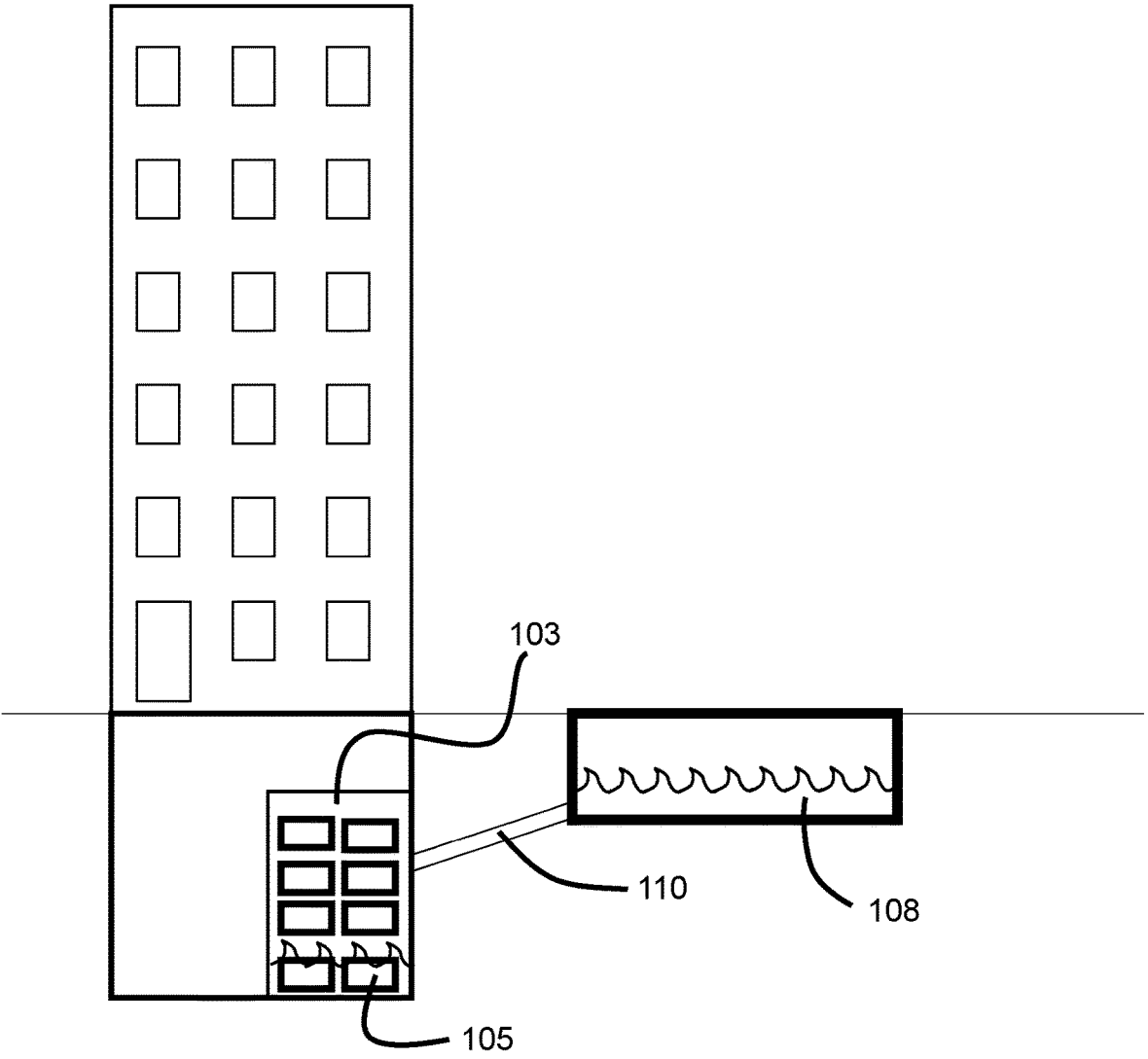
FIG. 4 is a schematic illustration of a safety system during or after the energy storage space is flooded.

FIG. 3 is a schematic drawing illustrating an example where the energy storage system 103 is a room in a building and where the reservoir 108 is located at a level which is higher than the energy storage space 103. The building may be an apartment building, an office building, etc. The building may for example have solar panels on the roof, and energy from them may be stored in the at least one ESS 105 comprised in the energy storage space 103. The reservoir 108 is exemplified by a swimming pool. FIG. 3 illustrates before the energy storage space 103 is flooded with fluid. FIG. 4 illustrates after the energy storage space 103 has been flooded with fluid. In FIG. 4, an example where the two ESS 105 located close to the floor or bottom of the energy storage space 103 are submerged with the fluid. The rest of the ESS 105 are not submerged, but may be submerged at a later time if the critical condition is still present even though the two ESS 105 at the bottom are submerged.

The ESS 105 which may be second life ESS are comprised in the energy storage space 103, located lower than the reservoir 108. The control unit 101 surveilling the state of health of the ESS 105 will detect any short-circuiting or onset of thermal runaway. In the case when turning off the system and isolation cell modules is not enough, the emergency routine, i.e. the present method, is activated.

The control unit 101 may ensure that doors into the energy storage space 103 are shut before the valves to the reservoir 108 are opened and fluid is lead through the conduit 110 down to the energy storage space 103 using gravity. The energy storage space 103 will fill up submerging the ESS 105 in fluid, cooling them down and hindering the thermal runaway to develop.

The submersion level of the energy storage space 103 may be controlled to only cover the lower ESS 105 in case these are the only ones in danger. And by doing this, potentially saving the above mounted ESS 105 to be used later.

Venting ports on the top of the energy storage space 103 may be opened to avoid pressure buildup in the energy storage space 103.

One or more fluid level sensors along the inside walls of the energy storage space 103 may keep control of the submersion level.

When deemed safe by rescue personnel, a pump may be attached to the drainage valves to deflood or drain the energy storage space 103 before opening up for inspection.

The energy storage space 103 may comprise various sensors as pressure, temperature etc for personnel to judge the situation from the outside and/or for providing measurements to the control unit 101.

Venting valves may be used to vent dangerous gases if needed.

Figure 5:
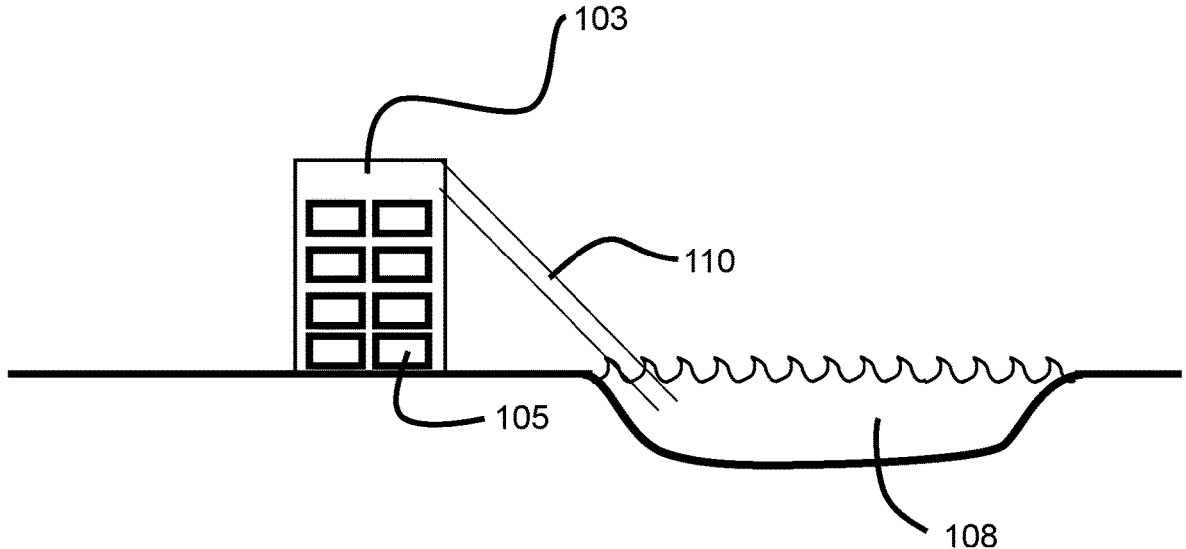
FIG. 5 is a schematic illustration of a safety system before the energy storage space is flooded.
Figure 6:
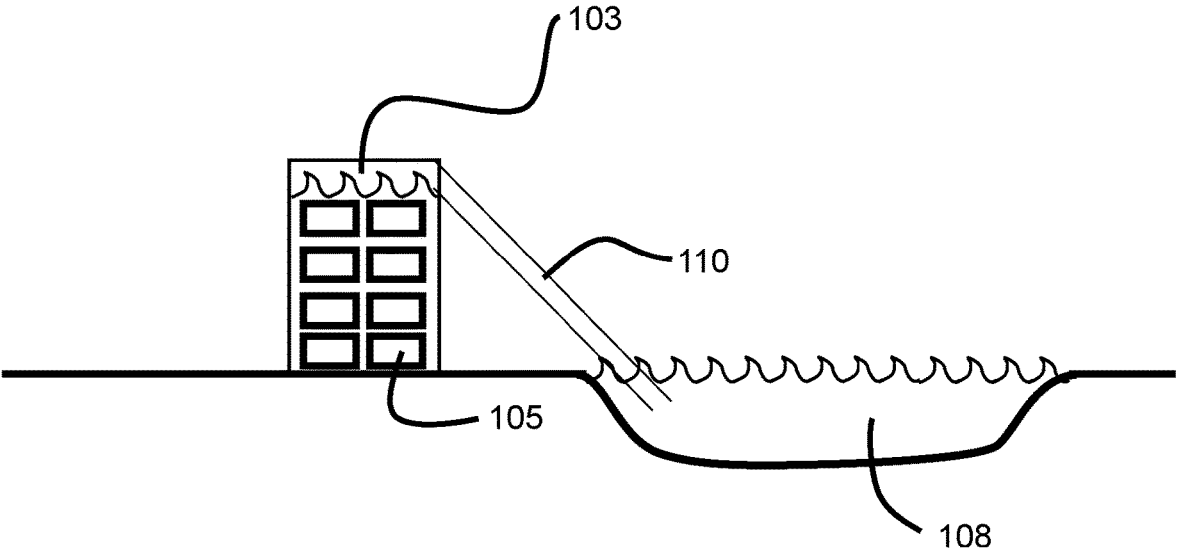
FIG. 6 is a schematic illustration of a safety system during or after the energy storage space is flooded.

FIG. 5 is a schematic drawing illustrating an example where the energy storage space 103 is a container and where the reservoir 108 is located at the same level or substantially at the same level as the energy storage space 103. The container may for example be located in the forest where the ESS 105 is intended to provide power to timber trucks. In another example, the container may be located at a construction site where the power grid is not established or where the power grid does not have sufficient capacity such that the at least one ESS 105 is intended to provide power to the necessary construction equipment and vehicles at the construction site. The reservoir 108 may be a lake in the forest, it may be a mobile fluid container etc. Since the energy storage space 103 and the reservoir 108 are located at the same level, there may be a pump adapted to pump the fluid from the reservoir 108 into the container. FIG. 5 illustrates before the energy storage space 103 is flooded with fluid. FIG. 6 illustrates after the energy storage space 103 has been flooded with fluid. The description of the example in FIGS. 3 and 4 above is also applicable to the example in FIGS. 5 and 6, but will not be repeated for the sake of simplicity.

Figure 7:
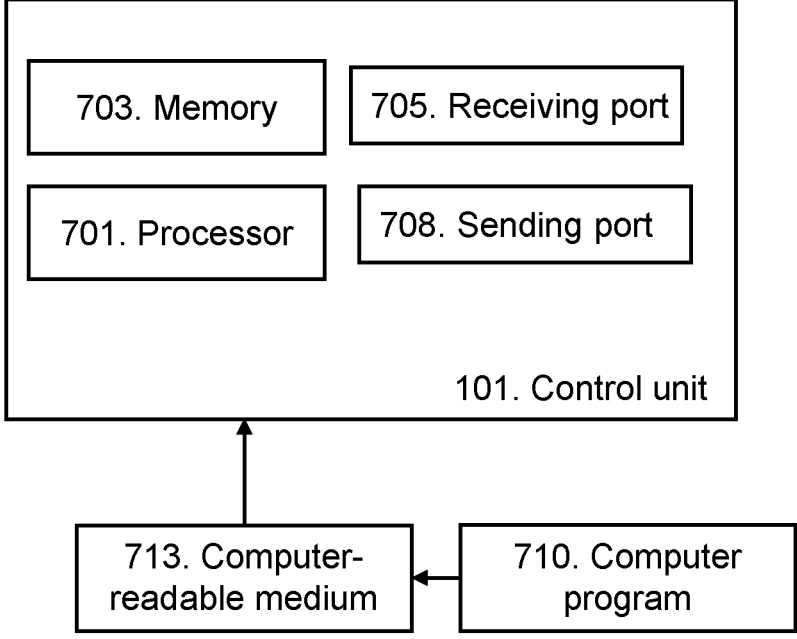
FIG. 7 is a block diagram illustrating a control unit.

To perform the method steps shown in FIG. 2 for controlling flooding of at least part of an energy storage space 103, the control unit 101 may comprises an arrangement as shown in FIG. 7.

The invention may be implemented through one or more processors, such as a processor 701 in the control unit 101 depicted in FIG. 7, together with computer program code for performing the functions and actions described herein. A processor, as used herein, may be understood to be a hardware component. The program code mentioned above may also be provided as a computer program product, for instance in the form of a data carrier carrying computer program code for performing the present disclosure when being loaded into the UE 105. One such carrier may be in the form of a CD ROM disc. It is however feasible with other data carriers such as a memory stick. The computer program code may be provided as pure program code on a server and downloaded to the control unit 101.

The control unit 101 may comprise a memory 703 comprising one or more memory units. The memory 703 is arranged to be used to store obtained information, store data, configurations, schedulings, and applications, sensor measurements, information about critical condition, fluid level measurements, etc. to perform the methods herein when being executed in the control unit 101.

The control unit 101 may receive information from, e.g., the first fluid level sensor, the second fluid level sensor, pressure sensor, temperature sensor, operator display, valves, vents, outlets, inlets etc., through a receiving port 705. The control unit 101 may receive information from another structure in the safety system 100 through the receiving port 705. Since the receiving port 705 may be in communication with the processor 701, the receiving port 705 may then send the received information to the processor 701. The receiving port 705 may also be configured to receive other information.

The processor 701 in the control unit 101 may be configured to transmit or send information to the first fluid level sensor, the second fluid level sensor, pressure sensor, temperature sensor, operator display, valves, vents, outlets, inlets or another structure in the safety system 100, through a sending port 708, which may be in communication with the processor 701, and the memory 703.

Thus, the methods described herein for the control unit 101 may be respectively implemented by means of a computer program 713 product, comprising instructions, i.e., software code portions, which, when executed on at least one processor 701, cause the at least one processor 701 to carry out the actions described herein, as performed by the control unit 101. The computer program 710 product may be stored on a computer-readable storage medium 713. The computer-readable storage medium 713, having stored thereon the computer program 710, may comprise instructions which, when executed on at least one processor 701, cause the at least one processor 701 to carry out the actions described herein, as performed by the control unit 101. The computer-readable storage medium 713 may be a non-transitory computer-readable storage medium, such as a CD ROM disc, or a memory stick. The computer program 710 product may be stored on a carrier containing the computer program 710 just described, wherein the carrier is one of an electronic signal, optical signal, radio signal, or the first computer-readable storage medium 713, as described above.

The UE 105 may comprise a communication interface configured to facilitate communications between the control unit 101 and other nodes, devices, or structures in the safety system 100 or outside the safety system. The interface may comprise a transceiver configured to transmit and receive radio signals over an air interface in accordance with a suitable standard.

The control unit 101 may be an electronic control unit comprising processing circuitry for performing the method described herein. The control unit 101 may be a computer. The control unit 101 may comprise hardware or hardware and software.

A computer program may comprise program code means for performing method described herein, when said program is run on a computer, e.g., the control unit 101.

A computer readable medium may carry a computer program comprising program code means for performing the method described herein when the program product is run on a computer, e.g., the control unit 101.

It should be noted that the communication described herein may be performed via a communication link that may be of any suitable kind including either a wired or wireless link.

Some embodiments described herein may be summarised in the following manner:

1. A fault and system shutdown occurs in at least one ESS 105.
2. The ESS 105 starts overheating.
3. A limit is reached, i.e. critical condition is detected, where flooding is activated to avoid or remove the thermal runaway.
4. Valves to the reservoir 108 are opened.
5. The energy storage space 103 is flooded by fluid while emergency personnel is on its way.

With the present invention, the energy storage space 103 itself is flooded with the fluid when a critical condition is detected. This is different from flooding a separate cabinet or compartment within the energy storage space 103. At least one ESS 105 is submersed as quickly as possible when the critical is detected. The invention prevents that a critical condition associated with at least one ESS 105 in the energy storage space 103 leads to a hazardous situation.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It is to be understood that the present invention is not limited to the embodiments described above and illustrated in the drawings; rather, the skilled person will recognize that many changes and modifications may be made within the scope of the appended claims.

The invention claimed is:

1. A method performed by a control unit for controlling flooding of at least part of an energy storage space, wherein the energy storage space comprises at least one Energy Storage System, ESS, the method comprising:
    detecting that a critical condition associated with the at least one ESS is present;
    when the critical condition has been detected, initiating flooding of at least part of the energy storage space with a fluid from a reservoir;
    controlling the flooding of the energy storage space such that the at least one ESS is submersed to a submersion level where the critical condition is no longer present; and
    monitoring a temperature of the fluid flooding into the energy storage space to detect if the temperature is above a temperature threshold; and
    initiating draining of the fluid from the energy storage space if the temperature is above the temperature threshold.

2. The method according to claim 1, comprising:
    detecting that the submersion level in the energy storage space has reached a first threshold;
    when the first threshold is reached, determining if the critical condition is still present or not;
    determining to continue flooding the at least part of the energy storage space if the critical condition is still present; and
    initiating a stop of the flooding if the critical condition is not present.

3. The method according to claim 1, comprising:
    initiating closing of one or more openings of the energy storage space when the critical condition has been detected and before initiating the flooding.

4. The method according to claim 1, wherein the fluid is comprised in the reservoir located at a higher level than the energy storage space, at a lower level than the energy storage space or at a same level as the energy storage space.

5. The method according to claim 1, wherein the flooding is initiated by opening at least one fluid valve and/or activating a pump connected to the reservoir enabling the fluid to flow from the reservoir and into to the energy storage space.

6. The method according to claim 1, wherein the critical condition is a short-circuit, a thermal runaway or a thermal event.

7. The method according to claim 1, comprising:
    initiating opening of at least one pressure vent in the energy storage space when the flooding has been initiated or if pressure in the energy storage space above a pressure threshold has been detected after the flooding has been initiated.

8. The method according to claim 1, comprising:
    detecting that the critical condition is no longer present; and
    initiating emptying of the fluid from the energy storage space when the critical condition is no longer present.

9. The method according to claim 1, comprising:
    detecting that a fluid level in the reservoir is below a fluid level threshold; and
    initiating flooding of additional fluid from another reservoir when the fluid level is below the fluid level threshold.

10. The method according to claim 1, wherein the energy storage space is a room or a container.

11. The method according to claim 1, wherein the flooding of the at least part of the energy storage space continues at the same time as the draining takes place.

\* \* \* \* \*